United States Patent
Butler (10) Patent No.: US 7,908,316 B2
(45) Date of Patent: Mar. 15, 2011

(54) COMMERCIAL EXTENSIONS TO WEB SERVICES

(75) Inventor: James M. Butler, Tyngsboro, MA (US)

(73) Assignee: Grid Nova, Inc., Tyngsboro, MA (US)

( * ) Notice: Subject to any disclaimer, the term of this patent is extended or adjusted under 35 U.S.C. 154(b) by 810 days.

(21) Appl. No.: 11/423,480

(22) Filed: Jun. 12, 2006

(65) Prior Publication Data

US 2007/0016665 A1    Jan. 18, 2007

Related U.S. Application Data

(60) Provisional application No. 60/699,125, filed on Jul. 14, 2005.

(51) Int. Cl.
*G06F 15/16*    (2006.01)
(52) U.S. Cl. .......................................... 709/203; 709/204
(58) Field of Classification Search .................... 709/204
See application file for complete search history.

(56) References Cited

U.S. PATENT DOCUMENTS

| | | | |
|---|---|---|---|
| 2003/0233631 A1* | 12/2003 | Curry et al. | 717/100 |
| 2004/0103426 A1* | 5/2004 | Ludvig et al. | 725/9 |
| 2004/0255006 A1* | 12/2004 | Collet et al. | 709/218 |
| 2005/0015491 A1* | 1/2005 | Koeppel | 709/226 |
| 2006/0031395 A1* | 2/2006 | Kumagawa et al. | 709/217 |
| 2006/0136351 A1* | 6/2006 | Angrish et al. | 707/1 |
| 2006/0149756 A1* | 7/2006 | Walker | 707/100 |
| 2006/0179150 A1* | 8/2006 | Farley et al. | 709/228 |
| 2007/0038756 A1* | 2/2007 | Waldorf et al. | 709/227 |

* cited by examiner

*Primary Examiner* — Jeffrey Pwu
*Assistant Examiner* — Shaq Taha
(74) *Attorney, Agent, or Firm* — Barlow, Josephs & Holmes, Ltd.

(57) ABSTRACT

A system for providing granular functionality called web services to commercial customers includes among other things a client to issue service requests and receive responses, a web server configured to accept and process service requests, and a means of accounting for usage. The current art specifies standards for functional interactions between web service clients and servers. A set of commercial extensions are defined herein to enable maintenance interactions. This "maintenance protocol" includes operations such as client software that is self-updating in response to server changes and the capability of reconciling client usage logs with service provider invoicing.

21 Claims, 6 Drawing Sheets

COMMERCIAL EXTENSIONS TO WEB SERVICES

CROSS-REFERENCE TO RELATED APPLICATION

This application is related to and claims priority from earlier filed provisional patent application Ser. No. 60/699,125, filed Jul. 14, 2005.

BACKGROUND OF THE INVENTION

1. Field of the Invention

The present invention is directed to the commercialization of web services and in particular, to the interactions between subscriber and provider systems, where the web services in question are of mission critical importance to the subscriber and the use of which is offered for sale by a commercial provider.

2. Background Information

A "web service" is a means by which a software program referred to as a "client" executing on one computer can invoke functionality within another program referred to as a "service" executing on another computer over the Internet and using industry standards such as HTTP, XML, XML Schema, and WSDL. Web services have become a popular means of integrating applications within an enterprise or between an enterprise and its business partners.

In addition, there are many examples of potential services that could be offered commercially by a third party. In such a case, an enterprise using commercial web services is a "subscriber" using the web services offered by a web service "provider".

Adoption of commercial web services has been slow, however. One reason for this is that despite numerous code generation tools, significant client development is still required especially if multiple providers are involved. This is because a very large range of technical options exist within the so-called standards concerning security, qualities of service, and other technical characteristics. Another reason is that service interfaces and these technical modes change over time as the services and/or provider evolve causing additional downstream development effort. Finally, current standards do not include business enablers such as reconciliation of subscriber usage with provider invoicing.

These issues introduce substantial risk and cost to an enterprise desiring to adopt commercial web services as part of their information technology infrastructure.

SUMMARY OF THE INVENTION

The aforementioned issues inhibiting commercial web service adoption can be mitigated through a series of extensions to the basic web service interaction hereinafter referred to as "commercial extensions". The purpose of these commercial extensions is to make viable a proliferation of commercial web service use throughout an enterprise.

From the subscriber's perspective, a special client component is used as the web service client. This component understands the web service standards current in the art, but also implements support for the commercial extensions. This special client component, hereinafter referred to as the "commercial client", extends the standards with capabilities including sensing and applying software updates to itself in response to provider changes and audit logging to enable reconciliation with provider invoicing.

To enable the full capabilities of the commercial client, the provider must implement matching capabilities. These capabilities include a client update and distribution facility and invoice presentment in a manner to enable client audit reconciliation. The present invention defines these capabilities along with those of the commercial client, thus giving rise to a "maintenance protocol" between the two.

These commercial extensions enable an enterprise to widely incorporate external web service functionality while mitigating the risk of substantial maintenance development multiplied by the potentially large number of client instances.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
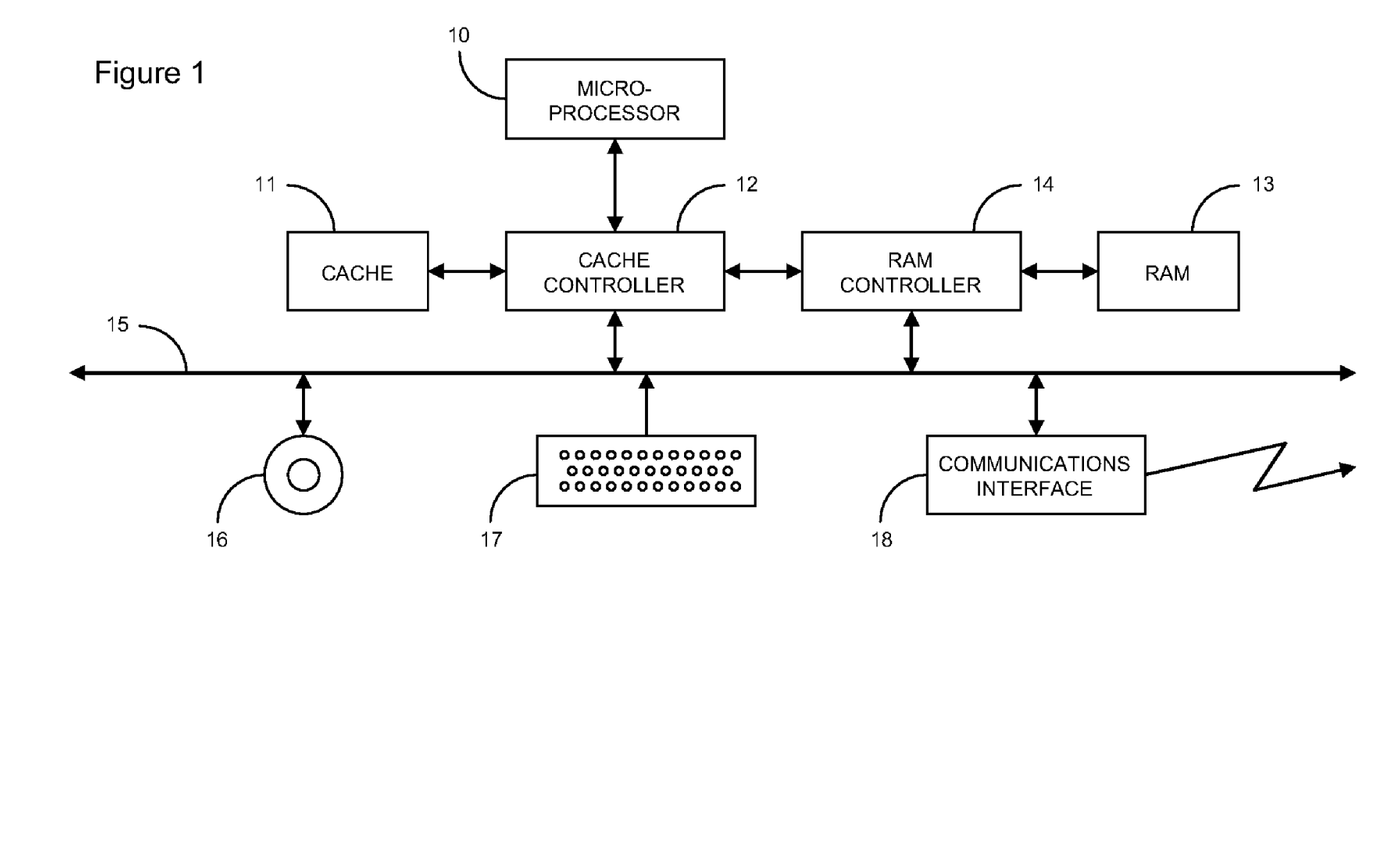
FIG. 1 is a block diagram of a typical computer system that employs the present invention's teachings.

The approach to be descried herein for providing commercial grade web services interactions will typically be implemented in computer systems employed for communicating over the Internet and executing web services functionality. The particular type of computer system employed for this purpose is not critical, but FIG. 1 depicts one type of workstation that can be employed in such a system.

Data that a microprocessor 10 uses and instructions for operating on them may reside in on-board cache memory or be received from further cache memory 11, possibly through the mediation of a cache controller 12. That controller 12 can in turn receive such data from system random access memory ("RAM") 13 through a RAM controller 14 or from various peripheral devices through a system bus 15. The memory space made available to an application program may be "virtual" in the sense that it may actually be considerably larger than RAM 13 provides. So the RAM contents will be swapped to and from a system disk 16.

Additionally, the actual physical operations performed to access some of the most-recently visited parts of the process's address space often will actually be performed in the cache 11 or in a cache on board microprocessor 10 rather than on the RAM 13. Those caches would swap data and instructions with the RAM 13 just as RAM 13 and system disk 16 do with each other.

Independently of the particular memory arrangement that a particular workstation employs, it will typically include some type of user-input device such as a keyboard 17 or mouse (not shown). By using such devices, the user enters data and commands as appropriate. In the case of a workstation employed by subscriber and/or provider personnel, such devices would be used for, among other things, configuring and monitoring web service execution.

Systems that implement the present invention's teachings will vary widely in architecture, but they will all be so arranged as to permit integration with each other over a local area network and between subscribers and providers over the Internet. Although subscriber and/or provider personnel may use common workstations, a more-typical arrangement is for different workstations to be used by personnel of different types. In such a case, the workstation would ordinarily be provided with some kind of communications interface 18 to communicate with other workstations or a common data server.

Figure 2:
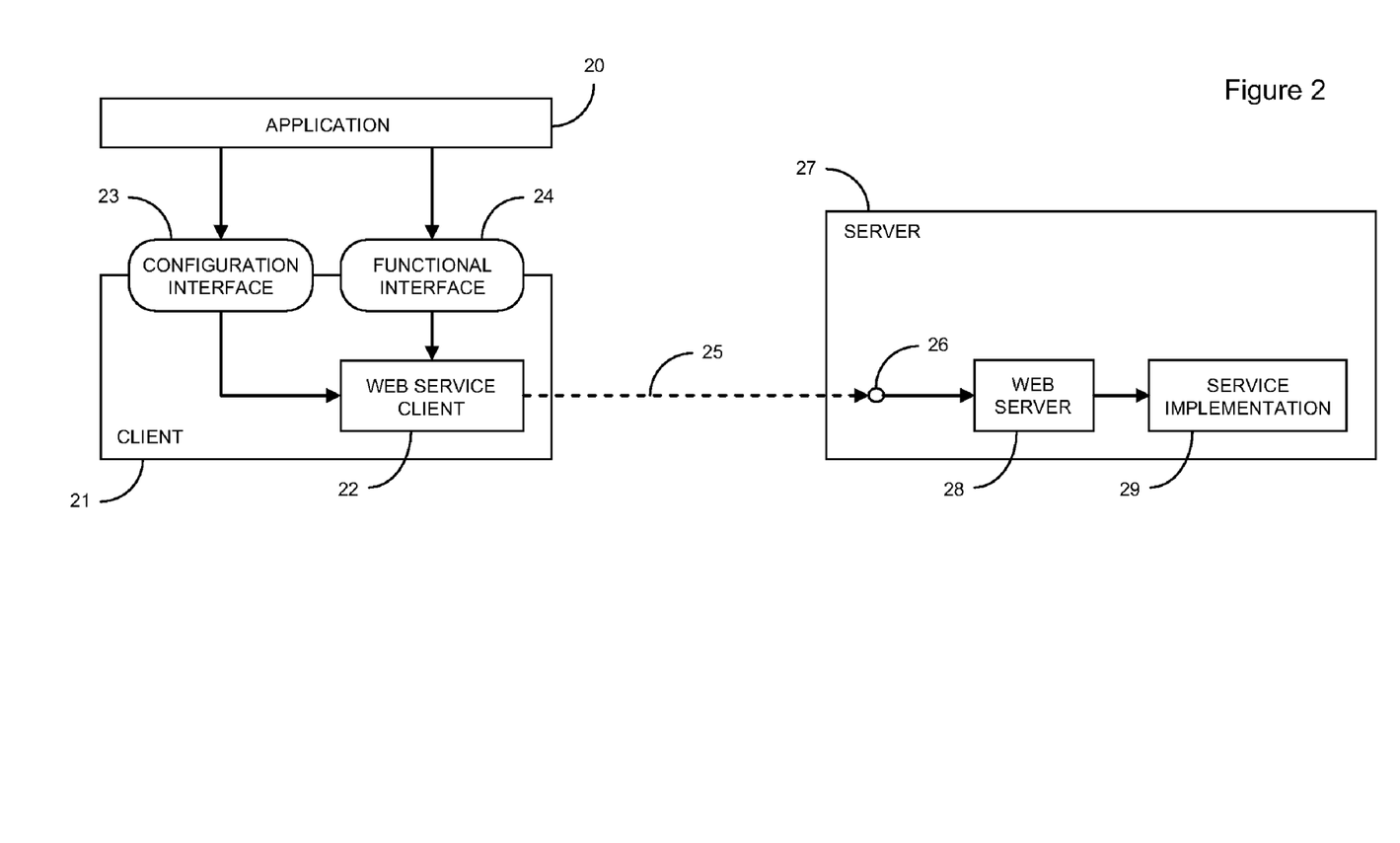
FIG. 2 is a block diagram illustrating the typical components involved in a web service interaction.

To provide context for discussing commercial extensions to web services, a baseline view of a typical web service block diagram is depicted in FIG. 2. An application 20 that benefits from the use of a web service does so by employing a client 21. Clients will vary widely in design, but they will all have some type of functional interface 24 through which the application 20 accesses web service functionality, the actual web service client 22 that interacts with the web service over the Internet 25 using applicable industry standards, and a configuration interface 23 that enables the application 20 to set various options that control certain aspects of web service client 22 behavior.

The web service is embodied in a server 27 with access to the Internet 25. As with clients, these servers will vary widely in design and architecture, but all can be thought of as comprising a web server 28 that manages the communication protocols specific to web interactions, the implementation 29 of the web service responsible for executing the functionality of interest to the application 20, and a web service interface 26 defined by a Web Service Description Language (WSDL) specification. This interface is often referred to as a web service "endpoint". This WSDL specification is published by the web service provider and guides most development aspects of the client 21.

Figure 3:
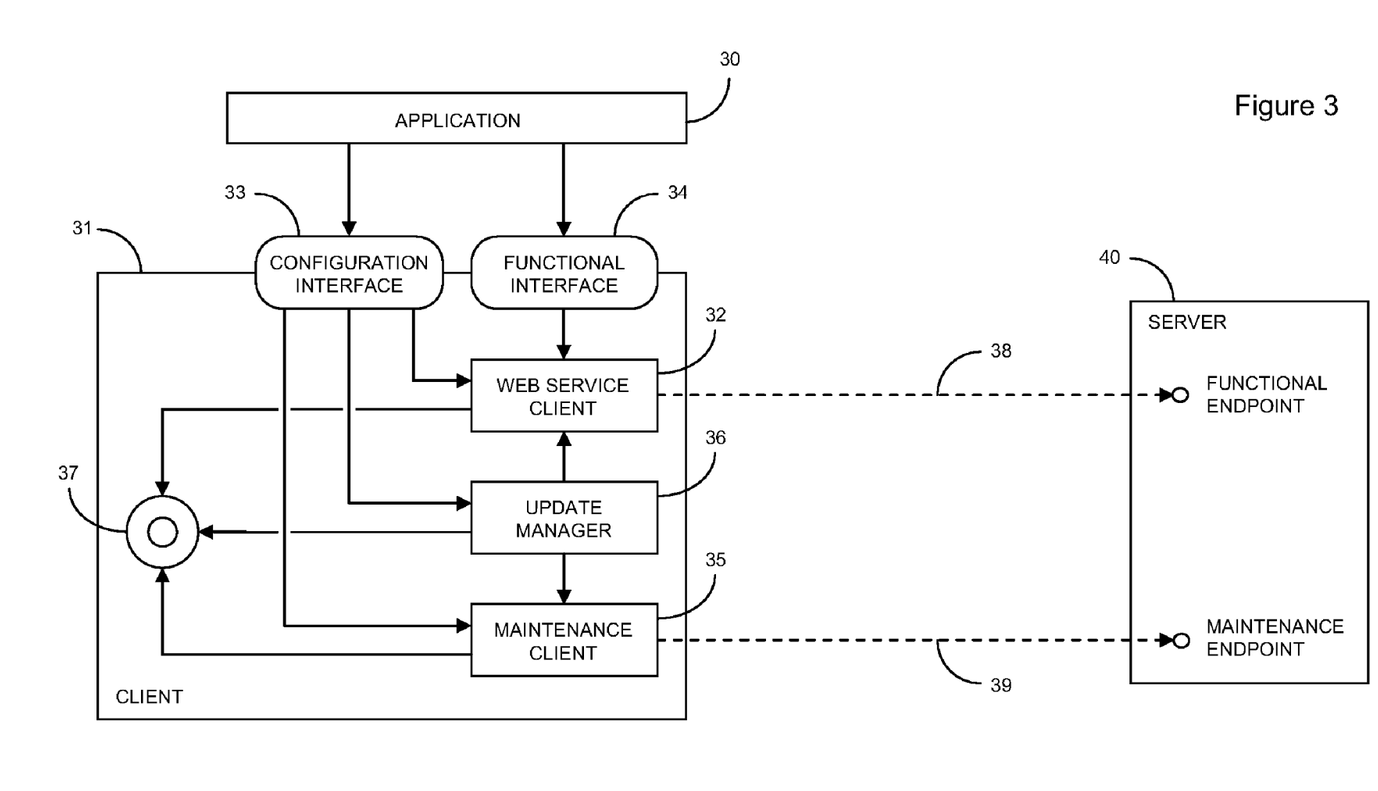
FIG. 3 is a block diagram illustrating the commercial client components involved in web service interactions with the extensions defined in the present invention.
Figure 4:
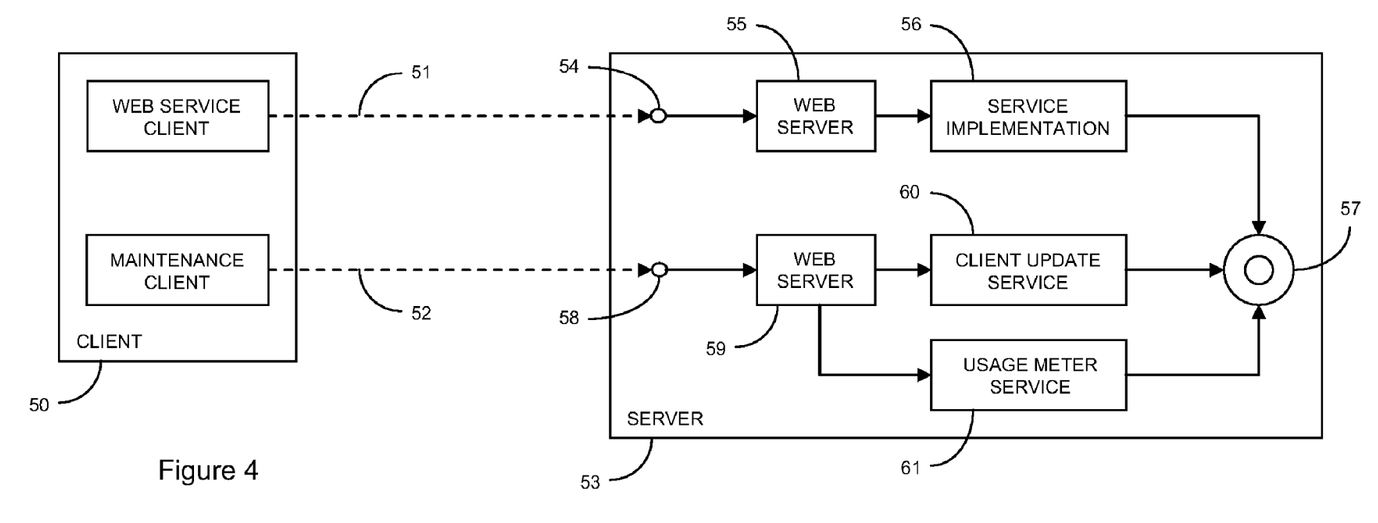
FIG. 4 is a block diagram illustrating the server-side components involved in web service interactions with the commercial extensions defined in the present invention.

FIG. 3 and FIG. 4 present block diagrams of the commercial extensions to the client and server, respectively, professed by the present invention. Beginning with the client-side in FIG. 3, the general topology is equivalent to the baseline web service in that an application 30 uses a client 31 to access a web service embodied in a server 40. The baseline components within the client 31 are also still present, specifically the functional interface 34, the configuration interface 33, and the core web service client 32 that interacts over the Internet 38 with the server 40.

The major change is the addition of a maintenance client 35, which also interacts over the Internet 39 with the server 40. In terms of technology, the maintenance client 35 is similar to the web service client 32 in that they both use web service standards and protocols to access functionality implemented on a remote server. However, while the web service client 32 focuses on the functionality of primary interest to the application 30, the maintenance client 35 accesses a secondary set of web services that pertain specifically to maintenance of the client 31.

Furthermore, in the larger context of a plurality of applications 30 using many different clients 31 to access a broad range of web services, the maintenance clients 35 within each varying type of client 31 all interact with the same maintenance oriented web services. These maintenance functions can be thought of as a "maintenance protocol" used in common by all commercial clients 31 regardless of the functionality they primarily bring to the applications 30 within which they have been embedded.

The maintenance protocol enables the establishment of secondary services in contrast to the primary services or application functionality. These secondary services enable two main operations: client updating and usage reconciliation.

Client updating refers to the automatic downloading and installation of updates to client components such as the web service client 32. The reasons for such updates include correcting software defects, supporting new versions of web service communication standards, compensating for revised web service specifications such that functional interfaces 34 do not impact applications 30, and making available new configuration options. A new component called the update manager 36 uses the maintenance client 35 to check the server 40 for applicable updates. If such updates exist, the update manager 36 directs the maintenance client 35 to download the updates and proceeds to install them within the client without the need for human engineering involvement. The current states of internal component versions are tracked in a local store 37.

Usage reconciliation refers to the comparison of usage as recorded by a client 31 with usage as recorded by the server 40 emanating from that client 31. Usage in this context refers to the number of web service calls of various types made by the web service client 32 and not the maintenance client 35. As the web service client 32 is called upon to access web services, it logs an account of these events with timestamps to a local store 37. At some predefined interval or upon request through the configuration interface 33, the maintenance client can request the server's accounting of these usage events by the client 31 in question and for a specified time range. The maintenance client 35 then compares usage accountings and reports any discrepancies in some fashion.

The logical flows of client updating and usage reconciliation operations will be detailed in due course.

FIG. 4 depicts the block diagram of the server-side support for the commercial extensions and specifically the maintenance protocol. The client 50 communicates with the server 53 invoking functional or primary services via the functional endpoint 54 and maintenance or secondary services via the maintenance endpoint 58. Both endpoints are defined by WSDL specifications. However, while the WSDL for the functional endpoint 54 varies with the types of web services offered (i.e., their primary functionality), the WSDL for the maintenance endpoint 58 is common for use by all commercial clients regardless of the primary functionality they may normally access.

Supporting the functional endpoint 54, the web server 55 and service implementation 56 serve the same purposes as in the baseline web service topology with one exception. In addition to providing the primary functionality, the service implementation 56 also records usage events with timestamps in the server storage medium 57 to support the usage reconciliation operations.

The maintenance endpoint 58 is also supported by a web server 59 that may or may not be shared by the functional web server 55. As a recommended best practice, they would be separate to enable the maintenance endpoint 58 to be accessed using a web address or URL that is independent of functional URLs. A separate maintenance web server also enables a provider to have a single server supporting the maintenance protocol for primary web service functions implemented across a plurality of servers.

In either case, calls for maintenance web services are delegated to their respective implementations, in this case the client update service 60 and the usage meter service 61. The client update service 60 supports operations such as checking if any updates are available relative to a particular client 50 with a particular configuration and downloading those updates when requested. The update artifacts and rules for determining appropriate update actions are managed and maintained in the server storage medium 57. The usage meter operations would include preparing and returning a report from records in the server storage medium 57 indicating service implementation 56 usage by a specific client 50 during a specific time window.

Figure 5:
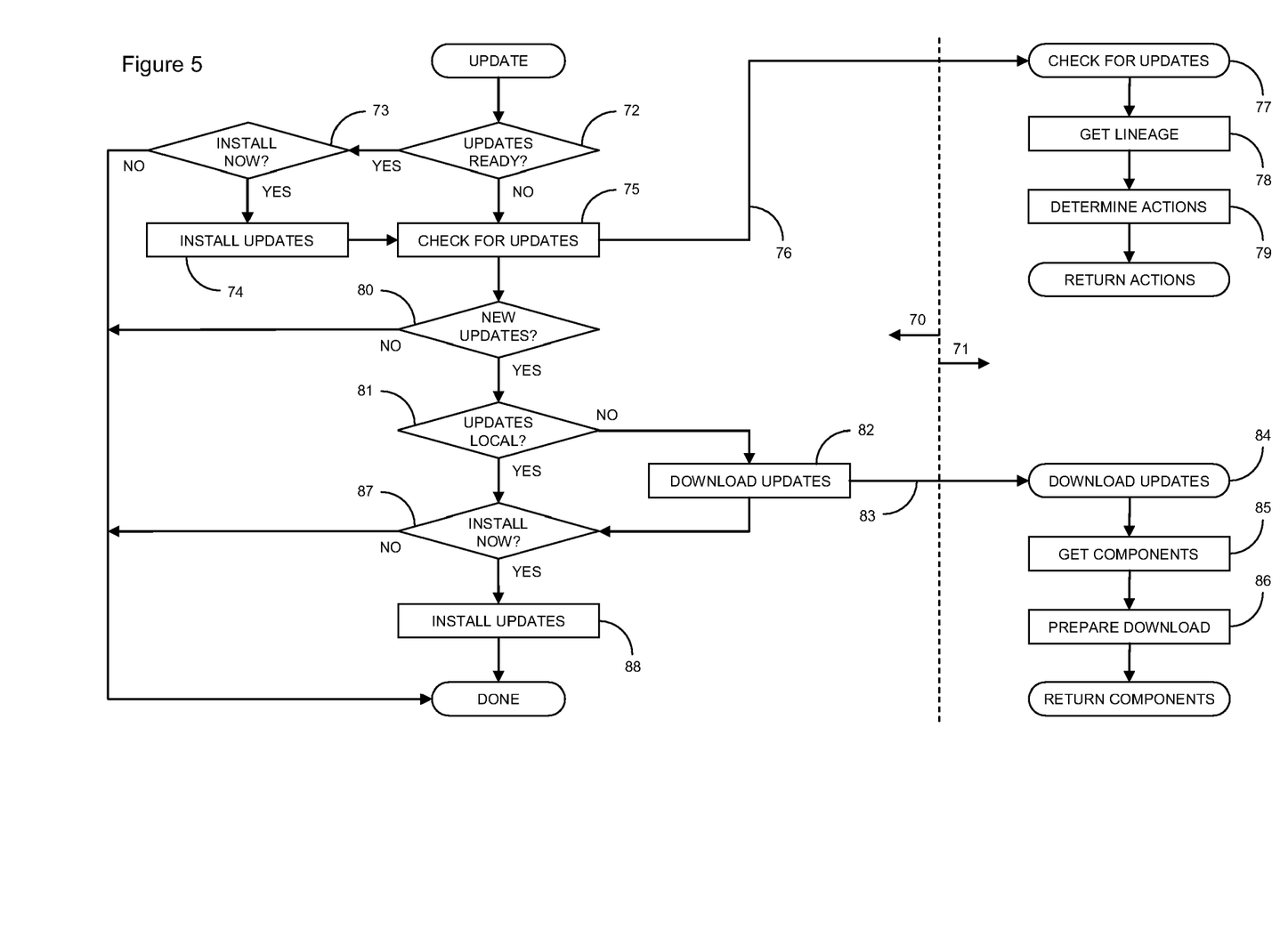
FIG. 5 is a flowchart of the computer routines use to implement the logic of the self-updating client capability.

FIG. 5 depicts the logical flow of the client update process where the left side 70 of the figure represents client-side logic and the right side 71 of the figure represents server side logic in response to web service calls from the client 70 using the maintenance protocol.

The updating process is configurable whereby at the option of some subscriber system administrator, available updates may be downloaded and either installed immediately or held locally for installation at some later time. The latter option is often useful so that software installations, which may require that the client 70 temporarily suspend service depending on the implementation technology and its design, can be deferred to a time of low usage such as late night or weekends. Another configurable option can allow a downloaded update to be placed in a local storage medium whereby it may be made available to other similar client 70 instances, thus avoiding the server 71 and network overhead of redundant downloading.

Upon some preconfigured event, the client 70 initiates the update process. This event may be on demand, periodic based on a time interval (e.g., daily), periodically after some n number of service calls (e.g., after every 10,000 calls), or any combination thereof. There is no logical harm in invoking this process frequently, but excessive invocation can lead to performance overhead on both the client 70 and server 71.

Upon invocation, the process first checks 72 if updates have been downloaded previously, but not yet installed waiting for a preconfigured installation time. If so, the process checks 73 if it is time to install these updates. If so, the updates are installed 74 and the process continues. Otherwise, the process quits rather than continuing, thus preventing possible downloads of additional updates while some are pending installation.

If there are no uninstalled updates either because they were just installed 74 or because there were none to begin with 72, the process checks for updates 75 by invoking a maintenance web service 77. When making this call 76, the client 70 includes information as to its particular type and a detailed manifest of its components and their versions. On the server 71, the web service retrieves 78 the up-to-date software lineage for this type of client, compares this lineage with the configuration state of the client 70 to determine 79 appropriate update actions if any, and returns these actions as an ordered list of components and versions that the client should download and install.

Back on the client 70, if the list of update actions is empty 80, then the process quits. If actions are recommended, then the local storage medium is consulted 81 to determine if another similar client may have already downloaded any of the components in question. If any of the components are not already local, then the process downloads 82 these missing components by invoking a maintenance web service 84. When making this call 83, the client 70 includes a list of the requested components and their versions. On the server 71, the web service retrieves 85 the components, and packages 86 them for returning to the client 70. The process then saves these components in its local storage medium making them available to other similar clients, thus avoiding redundant downloads.

With all components now local and available for installation, the process consults the configuration settings of the client 70 to determine 87 if these updates should be installed immediately in which case they are installed 88 or deferred until later in which case the process quits.

Revisiting the web service calls for checking for updates 77 versus downloading updates 84, one might suggest a simplification that combines these into a single service call. This is possible, but there are two advantages in the currently depicted separation. First, the mechanism of enabling a plurality of similar clients to share the same copy of downloaded components using a local storage medium relies on the ability to check for updates without actually committing to the download. In cases where there are many similar clients, this mechanism can dramatically reduce network overhead by eliminating multiple identical downloads. The second advantage lies in the potential of adding intelligence into the process by which not all update actions recommended by the server 71 are accepted by the client 70. The addition of such intelligence requires the separation of service calls to avoid the wasteful downloading of components that the client 70 has decided for whatever reason not to install.

Figure 6:
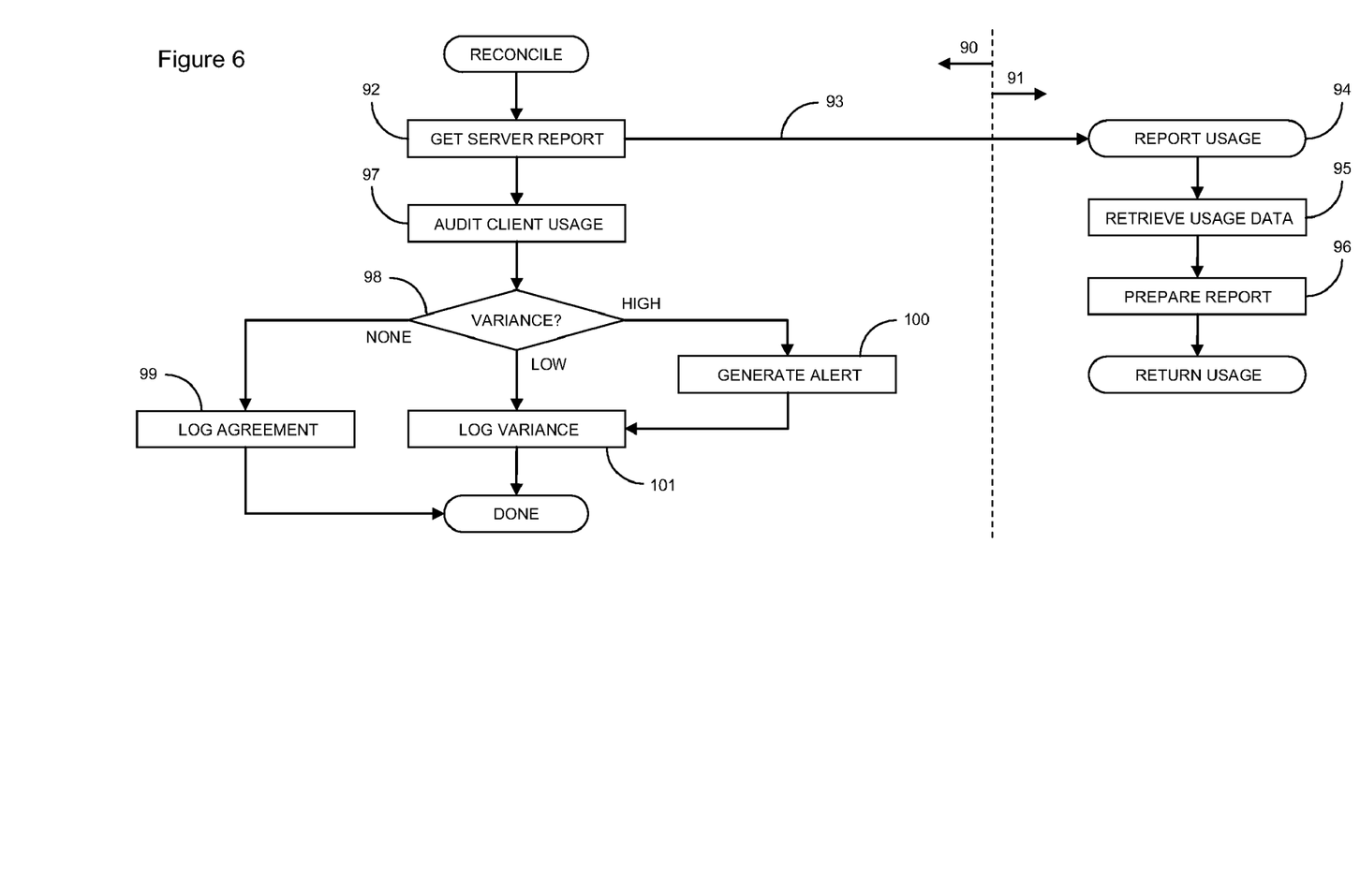
FIG. 6 is a flowchart of the computer routines used to implement the logic of invoice reconciliation.

FIG. 6 depicts the logical flow of the usage reconciliation process where the left side 90 of the figure represents client-side logic and the right side 91 of the figure represents server side logic in response to web service calls from the client 90 using the maintenance protocol.

Upon some preconfigured event, the client 90 initiates the reconciliation process. This event may be on demand or periodic based on a time interval such as weekly or monthly. When the process is invoked, the process requests 92 a usage report from the server 91 by invoking a maintenance web service 94. When making this call 93, the client 90 includes an identifier unique to that client or group of clients for which reconciliation is being conducted as well as a time range as a means of bounding the usage events under examination. This range might begin with the oldest usage event not yet reconciled and continue through "now" or it might be a calendar based range such as the entire previous month relative to "now".

On the server 91, the web service retrieves 95 the usage logs relevant to the specified client or client group and within the specified time range, prepares a report 96 thereof, and returns the report to the client 90.

The client 90 then audits 97 the local records of usage for itself or its client group during the specified time range against the usage report obtained from the server 91. The variance 98 between client 90 and server 91 views of usage can fall into one of three ranges: no variance meaning full agreement, low variance, or high variance. The threshold that determines low versus high variance is a configurable process parameter.

The principle behind the distinction, however, is that when dealing with thousands or millions of usage events that may cost a fraction of a cent each, very small variances may not be worth acting upon. Thus, in this context, a "low" variance is considered noteworthy, but acceptable. Furthermore, small variances may result naturally given that the system clocks of the client 90 and server 91 may not be in perfect synchronization. Therefore, events that occur just after midnight on one system might be logged as just before midnight on the other system. For web services that are lower volume carrying higher per-use fees, any variance may be unacceptable. In such cases, web service calls can carry unique request identifiers that can be individually audited and either marked as reconciled or disputed. This situation should be the minority of most web service scenarios.

Returning to the process as depicted in the figure, if no variance is detected, then this agreement is recorded 99 in a log of reconciliation events. The log entry will include the time of reconciliation, the time range of the usage events under examination, and potentially some identifier if available as to the first and last events reconciled. If any variance was detected, a similar recording 101 is made in the log, but with additional data to describe the variance in question.

Finally, if the variance exceeded the acceptable threshold rendering it a "high" variance, an alert of some kind is generated 100 notifying responsible subscriber personnel of the discrepancy and describing its nature and magnitude so that said personnel can initiate appropriate action with the commercial web service provider.

The maintenance operations described herein are critical to deploying commercial web services in real-world enterprises. The number of web service clients within a single enterprise can be such that routine software updates could overwhelm Information Technology staff, thus rendering large-scale deployment infeasible or hopelessly behind evolving providers. The client update function can eliminate much of this effort. Commercial web services also carry a business relationship that will inevitably have billing audits, inquiries, and disputes. The client usage reconciliation function can eliminate much of the drudge work considering that monthly web service hits can easily range into the millions. The maintenance protocol defined herein enables these functions to become a seamless substructure within a web services infrastructure in a manner not previously considered. The present invention therefore constitutes a significant advance in the art.

It would be appreciated by those skilled in the art that various changes and modifications can be made to the illustrated embodiments without departing from the spirit of the present invention. All such modifications and changes are intended to be covered by the appended claims.

What is claimed is:

1. A web services system, comprising:
   a web server on a server device connected to a network;
   a web service client on a client device communicatively interconnected to the web server via the network;
   a maintenance client on the client device communicatively interconnected to the web server via the network;
   an application communicatively interconnected to the web service client and the maintenance client on the client device;
   the web server being configured to receive a web service request from a subscriber via the web service client concerning functionality of the application; and
   the web server being configured to receive a web service request from a subscriber via the maintenance client concerning maintenance of the web service client;
   the maintenance of the web service client including a means for updating the web service client in response to server changes to ensure compatibility of operation of the web service client with the web service provided by the server; means for storing use of the web service client and use of the maintenance client on the client device; means for storing use of the web server to handle web service requests received and processed on the server device; means for logging and storing, on the web service client, the number of calls made by the web service client for a web service; means for logging and storing, on the web server, the number of web service requests received from the web service client for the web service;
   means for comparing the number of calls made by the web service client and stored on the web service client with the number of web service requests received and stored on the web server; and
   determining whether the number of calls made by the web service client stored on the web service client are different than the number of web service requests stored on the web server.

2. The web services system of claim 1, wherein the network is the Internet.

3. The web services system of claim 1, wherein the web service request from a subscriber via the maintenance client concerning maintenance of the web service client employs a maintenance protocol.

4. The web services system of claim 1, further comprising:
   an update manager communicatively interconnected to the web service client and the maintenance client, configured to instruct the maintenance client to query the web server to determine if the web service client is current.

5. The web services system of claim 4, wherein the maintenance client queries the web server at a periodic time interval to determine if the web service client is current.

6. The web services system of claim 4, wherein the maintenance client queries the web server on demand to determine if the web service client is current.

7. The web services system of claim 1, wherein the web service requests from the web service client and the maintenance client both use a web service protocol.

8. The web services system of claim 1, wherein the use of the web service client is compared to the use of the web server at periodic time intervals.

9. The web services system of claim 1, wherein the use of the web service client is compared to the use of the web server on demand.

10. A method of operating a web service, comprising the steps of:
    providing a web server on a server device connected to a network;
    providing a web service client on a client device communicatively interconnected to the web server via the network;
    providing a maintenance client on the client device communicatively interconnected to the web server via the network;
    providing an application communicatively interconnected to the web service client and the maintenance client on the client device;
    routing a web service request from a subscriber via the web service client concerning functionality of the application; and
    routing a web service request from a subscriber via the maintenance client concerning maintenance of the web service client;
    querying the web server by the maintenance client;
    determining if the web service client is current;
    updating the web service client to ensure compatibility of operation of the web service client with the web service provided by the server, in response to server changes, if it is not current;
    storing usage data of the web service client on the client device corresponding to the number of calls made by the web service client to the web server for a web service;
    storing usage data of the web server on the server device corresponding to the number of requests received from the web service client for the web service;
    reconciling usage data of the web service client as to the number of web service calls stored on the web service client with usage data on the web server as to the number of web service requests stored on the server device; the step of reconciling including the steps of:

comparing the number of calls by the web service client and stored on the client device with the number of web service requests received by the web server and stored on the server device; and determining a differential value between the number of calls by the client device and the number of web service requests received by the web server.

11. The method of claim 10, wherein the network is the Internet.

12. The method of claim 10, wherein the step of routing a web service request from a subscriber via the maintenance client concerning maintenance of the web service client is routing a maintenance protocol.

13. The method of claim 10, further comprising the step of: providing an update manager; and
instructing the maintenance client to query the web server by the update manager.

14. The method of claim 10, wherein the step of querying the web server is executed at a periodic time interval to determine if the web service client is current.

15. The method of claim 10, wherein the step of querying the web server is executed at on demand to determine if the web service client is current.

16. The method of claim 10, further comprising the step of: downloading an update to a update to the web service client if the web service is determined to be out of date.

17. The method of claim 10, further comprising the step of: logging the step of reconciling.

18. The method of claim 10, further comprising the step of: logging the differential value between the service implementation data on the client device and the usage data on the web server.

19. The method of claim 10, wherein the step of reconciling is executed periodically.

20. The method of claim 10, wherein the step of reconciling is executed on demand.

21. The method of claim 10, wherein the steps of routing a web service request from a subscriber via the web service client concerning functionality of the application and routing a web service request from a subscriber via the maintenance client concerning maintenance of the web service client employ a WSDL specification.

* * * * *